United States Patent [19]
Watanabe

[11] Patent Number: 4,760,259
[45] Date of Patent: Jul. 26, 1988

[54] RADIATION IMAGE RECORDING AND REPRODUCING METHOD
[75] Inventor: Yukio Watanabe, Kanagawa, Japan
[73] Assignee: Fuji Photo Film Co., Ltd., Kanagawa, Japan
[21] Appl. No.: 789,260
[22] Filed: Oct. 18, 1985
[30] Foreign Application Priority Data
Oct. 18, 1984 [JP] Japan ................................ 59-218857
[51] Int. Cl.⁴ ............................................... G03C 5/16
[52] U.S. Cl. ..................... 250/327.2; 378/162
[58] Field of Search .......................... 250/327.2, 484.1; 378/162, 165

[56] References Cited
U.S. PATENT DOCUMENTS
4,507,797  3/1985  Kato ................................. 378/165
4,543,479  9/1985  Kato ............................... 250/327.2
4,591,922  5/1986  Takano et al. ..................... 358/280
4,641,242  2/1987  Kimura .............................. 250/337

Primary Examiner—Carolyn E. Fields
Attorney, Agent, or Firm—Sughrue, Mion, Zinn, Macpeak & Seas

[57] ABSTRACT

In a radiation image recording and reproducing method wherein a plurality of stimulable phosphor sheets are reused by repeated circulation through a radiation image recording step, a radiation image read-out step, and an erasing step, each stimulable phosphor sheet is provided with its own identifying code and each time a visible image is reproduced the identifying code of the stimulable phosphor sheet on which the corresponding radiation image was stored is simultaneously reproduced, thereby enabling identification of sheets requiring replacement. The number of times each sheet is subjected to image readout is counted, and sheets are selectively removed after they circulate a predetermined number of times indicative of sheet wear out.

3 Claims, 2 Drawing Sheets

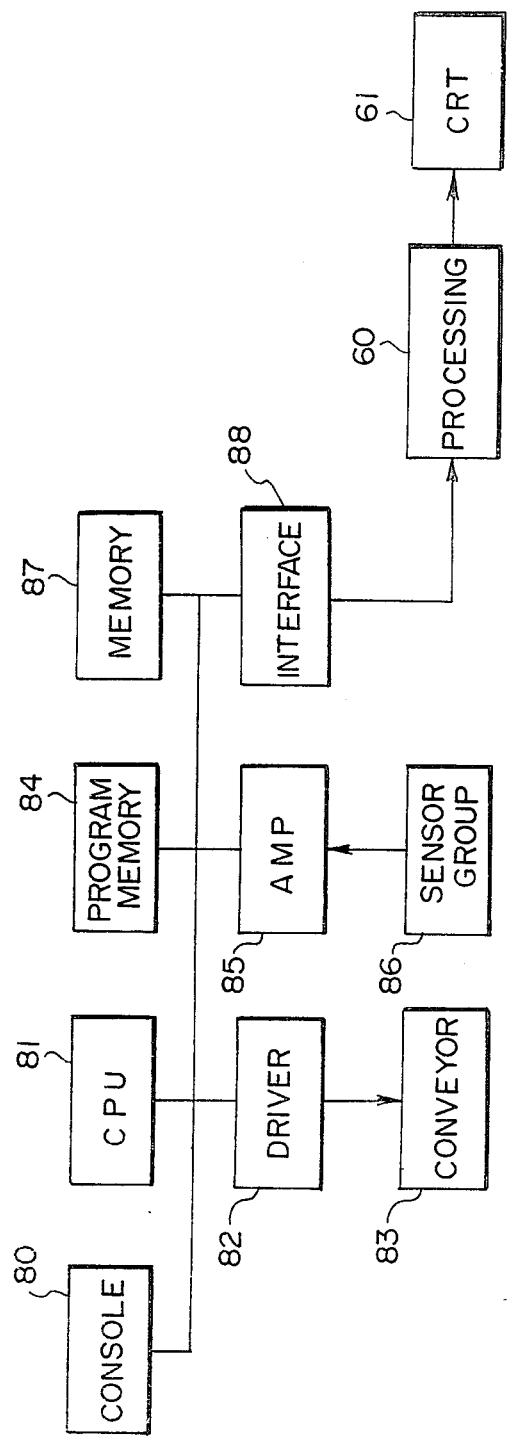
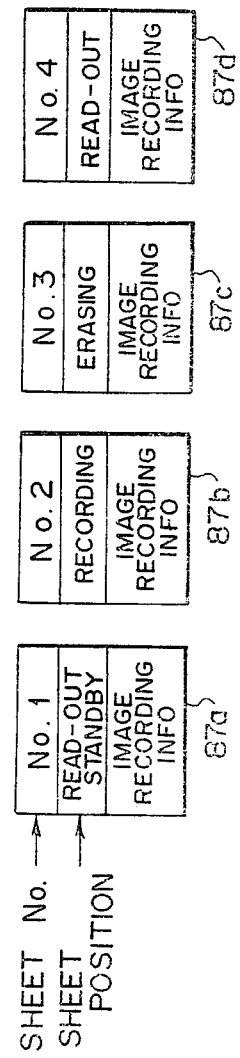

RADIATION IMAGE RECORDING AND REPRODUCING METHOD

BACKGROUND OF THE INVENTION

1. Field of the Invention

This invention relates to a method of recording a radiation image on a stimulable phosphor sheet, exposing the stimulable phosphor sheet to stimulating rays which cause it to emit light in proportion to the stored radiation energy, photoelectrically detecting the emitted light to obtain an electric image signal, and reproducing a visible radiation image from the electric image signal. This invention more particularly relates to a radiation image recording and reproducing method in which the stimulable phosphor sheets are circulated and reused for recording radiation images.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted from the phosphor in proportion to the stored energy of the radiation. A phosphor exhibiting such properties is referred to as a stimulable phosphor.

As disclosed for example in the applicant's Japanese Unexamined Patent Publication No. 56(1981)-11395 and U.S. Pat. No. 4,258,264, it has been proposed to use a stimulable phosphor in a radiation image recording and reproducing system. Specifically, a sheet comprising a layer of the stimulable phosphor is first exposed to a radiation passing through an object to have a radiation image stored thereon, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure. More specifically, since the amount of light emitted upon stimulation after the radiation energy is stored on the stimulable phosphor varies over a very wide range in proportion to the amount of energy stored thereon, it is possible to obtain an image having desirable density regardless of the amount of exposure of the stimulable phosphor to the radiation, by reading out the emitted light with an appropriate gain, converting it to an electric image signal and using the electric image signal to reproduce a visible image on a recording medium such as a photographic light-sensitive material or on a display device such as a CRT.

The system is also advantageous in that after the radiation image information stored on the stimulable phosphor sheet has been read out and converted into an electric image signal, the electric image signal can then be easily processed in the manner most appropriate for obtaining a radiation image suitable for viewing, particularly for diagnostic purposes, when it is used for reproducing a visible image on a photographic light-sensitive material or on a display device such as a CRT.

In this radiation image recording and reproducing system, the stimulable phosphor sheet is used only for temporarily storing the radiation image in order to reproduce the final visible image therefrom in a final recording medium. For economical reasons, therefore, it is desirable that the stimulable phosphor sheets be used repeatedly.

In order to reuse stimulable phoshphor sheets as described above, the radiation energy remaining on the stimulable phophor sheet after it is scanned with stimulating rays to read out the radiation image stored thereon should be eliminated or erased as described, for example, in Japanese Unexamined Patent Publication No. 56(1981)-12599 and U.S. Pat. No. 4,470,619. The stimulable phosphor sheet can then be used again for radiation image recording.

The applicant therefore proposed in Japanese Patent Application No. 58(1983)-66730 a radiation image recording and read-out apparatus comprising:

(i) a circulation and coveyance means for conveying at least one stimulable phosphor sheet for recording a radiation image thereon along a predetermined circulation path, (ii) an image recording section positioned on said circulation path for recording a radiation transmission image of an object on said stimulable phosphor sheet by exposing said stimulable phosphor sheet to a radiation passing through said object, (iii) an image read-out section positioned on said circulation path and consisting of a stimulating ray source for emitting stimulating rays for scanning said stimulable phosphor sheet carrying said radiation image stored thereon in said image recording section, and a photoelectric readout means for detecting light emitted from said stimulable phosphor sheet scanned with said stimulating rays to obtain an electric image signal, and (iv) an erasing section for, prior to the next image recording on said stimulable phosphor sheet for which the image read-out has been conducted in said image read-out section, having said stimulable phosphor sheet release the radiation energy remaining on said stimulable phosphor sheet;

whereby said stimulable phosphor sheet is circulated through said image recording section, said image read-out section and said erasing section and reused for radiation image recording.

When the stimulable phosphor sheets are reused in this way, however, they suffer gradual deterioration of their physical and chemical properties. Since it is not possible to obtain a high quality reproduced image from a sheet that has been excessively degraded through repeated use, it is necessary to replace the worn-out sheets with new ones. In a system in which the stimulable phosphor sheets are reused by circulating them through an image recording section, a image read-out section and an erasing section, however, it is generally impossible to identify which of the stimulable phosphor sheets circulating through the system have deteriorated to the point that they require replacement. This is because the cover of the radiation image read-out section has to be kept closed at all times during use so that when, as is almost always the case, a plurality of sheets are maintained in circulation within the system in order to enhance the efficiency of radiation image recording and read-out, it is virtually impossible to identify which sheet a particular reproduced image was obtained from.

This problem arises not only when the stimulable phosphor sheets are reused by circulating them through an integrated system such as described in the foregoing but also when image recording, read-out and reproduction are carried out on a plurality of stimulable phosphor sheets at separate apparatuses as when the work of processing the sheets is divided among a number of operators. In such cases, it becomes particularly difficult to ascertain the degree of degradation of the individual sheets when the electric image signals obtained by image read-out are once stored on a recording medium such as a magnetic disk and the visible images are later produced from the stored image information.

SUMMARY OF THE INVENTION

The primary object of the present invention is to provide a radiation image recording and reproducing method wherein the degree of deterioration of each of a plurality of repeatedly used stimulable phosphor sheets can be accurately ascertained.

For attaining this object, the present invention provides an improved radiation image recording and reproducing method wherein a plurality of stimulable phosphor sheets are reused by repeated circulation through a radiation image recording step in which the stimulable phosphor sheet is exposed to a radiation passing through and object to have a radiation image of the object stored thereon, a radiation image read-out step in which the stimulable phosphor sheet carrying the radiation image stored thereon is exposed to stimulating rays which cause it to emit light in proportion to the stored radiation energy, the emitted light being photoelectrically detected to obtain an electric image signal for reproducing a visible image, and an erasing step in which the stimulable phosphor sheet is, prior to the next image recording thereon, exposed to erasing light to release the radiation energy remaining thereon after said read-out step, wherein the improvement comprises providing each stimulable phosphor sheet with its own identifying code and each time a visible image is reproduced simultaneously reproducing the identifying code of the stimulable phosphor sheet on which the corresponding radiation image was stored.

For enabling simple reproduction of the identifying codes in accordance with this invention, a bar code or the like can be recorded directly on each stimulable phosphor sheet and be read out from the sheet together with the radiation image information stored thereon. Also, in a system in which the stimulable phosphor sheets are reused by being repeatedly conveyed along a circulation path as described in the foregoing, it is possible in accordance with the invention to store the identifying codes of the sheets in a memory, identify each sheet at the time it is subjected to image read-out in the read-out section, read the identifying code for the identified sheet from the memory, and send the identifying code read from the memory to a reproducing means for reproduction thereon.

In the radiation image recording and reproducing method according to the present invention, since the degree of deterioration of each of a plurality of stimulable phosphor sheets can be simply and accurately ascertained at all times, control of the quality of the sheets used in the recording and reproducing system is greatly facilitated. This effect is particularly large when applied to a system in which the stimulable phosphor sheets are repeatedly used by circulation within a radiation image recording and readout apparatus which is enclosed so that it is ordinarily impossible to confirm the positions of the individual sheets within the apparatus.

BRIEF DESCRIPTION OF THE DRAWINGS

FIG. 2 is a block diagram of the electrical control circuit of the apparatus shown in FIG. 1, and FIG. 3 is a diagram for explaining sheet supervision tables stored in a memory of the electrical control circuit shown in FIG. 2.

DESCRIPTION OF THE PREFERRED EMBODIMENT

Figure 1:
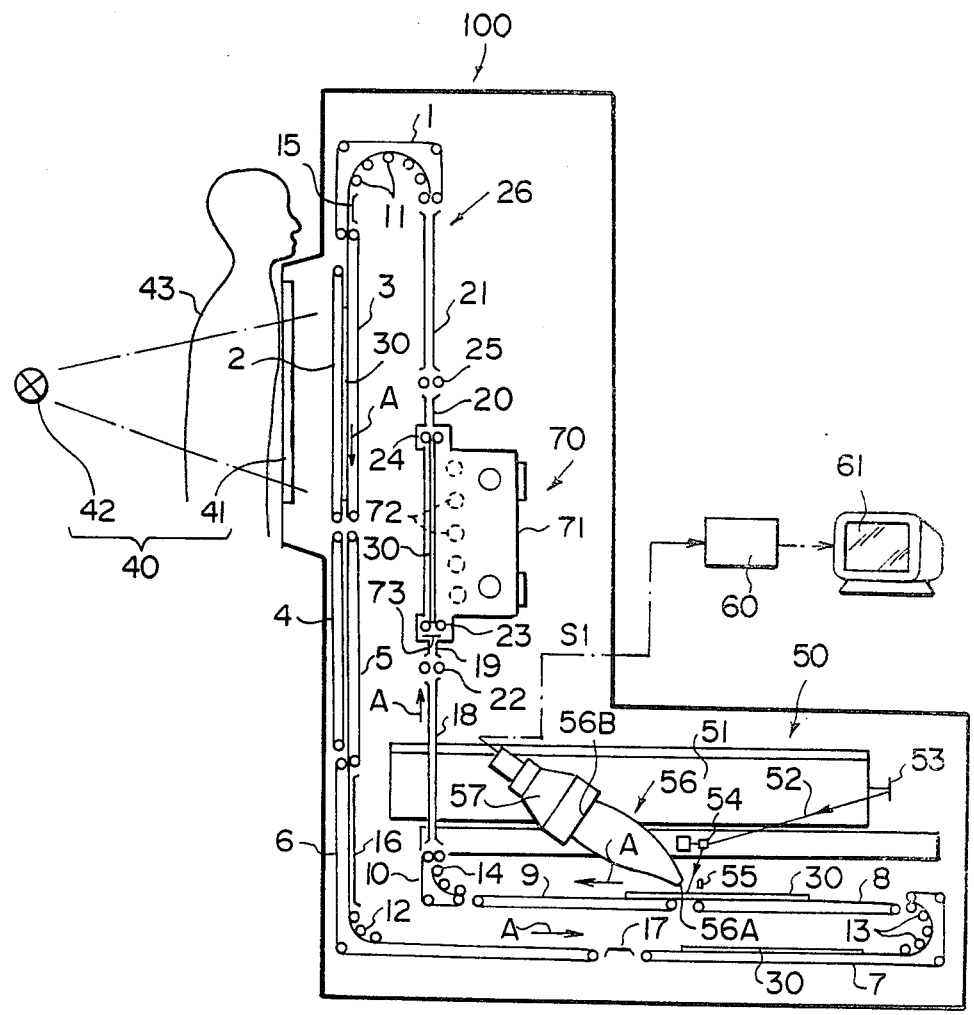
FIG. 1 is a schematic side view of an apparatus for carrying out the method of the present invention.

The present invention will hereinbelow be described in further detail with reference to the accompanying drawings.

FIG. 1 shows a radiation image recording and reproducing system for carrying out an embodiment of the radiation image recording and reproducing method according to the present invention. A radiation image recording and read-out apparatus 100 of this system is provided with a sheet circulation and conveyance means 26 comprising endless belts 1, 2, 3, 4, 5, 6, 7, 8, 9 and 10, guide rollers 11, 12, 13 and 14 rotated respectively by the endless belts 1, 6, 7 and 10, guide plates 15, 16, 17, 18, 19, 20 and 21, and nip rollers 22, 23, 24 and 25. In the sheet circulation and conveyance system, by way of example, four stimulable phosphor sheets are conveyed and circulated in spaced relation to each other in the direction as indicated by the arrow A by the endless belts 1–10 and the nip rolls 22–25.

The endless belts 2 and 3 are disposed so as to hold the stimulable phosphor sheets 30 vertically therebetween, and an image recording table 41 is positioned to the side (left side in the drawing) of the endlessbelts 2 and 3. A radiation source 42, e.g. an X-ray source, is spaced from the image recording table 41 to stand face to face with the endless belts 2 and 3. An image recording section 40 is constituted by the image recording table 41 and the radiation source 42. When a radiation image of an object 43 is recorded on the sheet 30, the sheet 30 is held between the endless belts 2 and 3 as shown in the drawing, and the radiation source 42 is activated with the object 43 positioned in front of the image recording table 41. In this way, the sheet 30 is exposed to a radiation passing through the object 43 to have a radiation image of the object 43 stored on the sheet 30.

An image read-out section 50 is positioned at the lower right end of the sheet circulation and conveyance system 26. At the image read-out section 50, a laser beam source 51 is positioned above the endless belt 8 constituting a part of the image read-out section 50, and a mirror 53 and a galvanometer mirror 54 are positioned for scanning a laser beam 52 emitted by the laser beam source 51 in the width direction of the sheet 30 placed on the endless belt 8. The galvanometer mirror 54 is swung in both directions to scan the laser beam 52 in the main scanning direction on the sheet 30 carrying the radiation image stored thereon. The sheet 30 has been subjected to image recording at the image recording section 40 and then conveyed by the sheet circulation and conveyance means 26 to the image read-out section 50. A light guiding reflection mirror 55 and a light guide member 56 are positioned along the main scanning direction at the scanning portion of the laser beam 52 on the sheet 30. When the sheet 30 is exposed to the laser beam 52, the sheet 30 emits light in proportion to the stored radiation energy. The light emitted by the sheet directly toward the light guide member 56 and the light emitted thereby and reflected by the light guiding reflection mirror 55 both enter the light guide member 56 from a light input face 56A thereof, and are guided inside of the light guide member 56 through total reflection to a light output face 56B thereof. The light is thus detected by a photomultiplier 57 connected to the light output face 56B of the light guide member 56. Simultaneously with the scanning of the sheet 30 by the laser beam 52 in the main scanning direction, the sheet is moved by the endless belt 8 in the sub-scanning direction, as indicated by the arrow A, approximately normal to the main scanning direction, so that the radiation image information is read out from the whole surface of the sheet 30. An electric image signal S1 obtained from the photomultiplier 57 is sent to an image processing circuit 60 for processing the electric image signal as required. The image signal thus processed is then sent to an image reproducing apparatus 61. The image reproducing apparatus may be a display device such as a CRT, or a device for recording a visible image by point-by-point scanning on a photographic film. Or, the image signal may be stored in a storage means such as a magnetic tape.

After image read-out is finished, the sheet 30 is conveyed by the endless belts 9 and 10 to pass between the guide plates 18, from where it is forwarded through the nip rollers 22 and the guide plates 19 to an erasing section 70. The erasing section 70 comprises a case 71 and many erasing light sources 72, e.g. fluorescent lamps, arranged within the case 71. After a shutter 73 is opened, the sheet 30 is conveyed into the case 71 by the nip rollers 23. Then the shutter 73 is closed, and the erasing light sources 72 are turned on. The erasing light sources 72 mainly emit light having a wavelength within the stimulation wavelength range for the stimulable phosphor sheet 30. When the sheet 30 is exposed to the erasing light, the radiation energy remaining in the sheet after the image read-out is released. At this time, since the shutter 73 is closed, no noise is generated in the read-out signal by erasing light leaking into the image read-out section 50.

After the radiation energy remaining on the sheet 30 is erased to such an extent that the next image recording on the sheet 30 is possible, the nip rollers 24 are rotated and the sheet 30 is conveyed out of the erasing section 70. Then the sheet is conveyed between the guide plates 20 to the nip rollers 25, which further convey it between the guide plates 21 to the endless belt 1. The sheet 30 is then conveyed to the image recording section 40 in the same manner as described earlier and is again used for recording a radiation image.

The circulation of the sheets 30 within the aforesaid radiation image recording and read-out apparatus 100 is controlled by an electrical control circuit as shown in FIG. 2. More specifically, instructions for the operation of the apparatus 100 are entered via a console 80 and corresponding operation signals output by the console 80 are fowarded to a CPU (central processing unit) 81 which on the basis of these signals and an operation program stored in a program memory 84 sends sheet conveyance control signals to a driver 82. In response to the received control signals, the driver 82 drives a sheet conveyance and circulation means 83 which comprises the endless belts 1-10, the nip rollers 22-25 as well as associated solenoids and the like. The electrical control circuit further comprises a group of sensors 86 (not shown in FIG. 1) for detecting the presence of the sheets 30, the individual sensors of which are located at the image recording section 40, the image read-out section 50 and the erasing section 70 as well as at positions before and after these sections. The sheet detection signals output by the sensors 86 are amplified by a sensor amplifier 85 and sent to the CPU 81. In response to these sheet detection signals, the CPU 81 times the stopping of the endless belts 1-10, the nip rollers 22-25 and the other elements of the sheet conveyance and circulating means 83 so as to stop the respective sheets 30 at predetermined positions.

The CPU 81 is connected with a non-volatile memory 87 wherein are stored sheet supervision tables 87a, 87b, 87c and 87d such as those shown in simple form in FIG. 3. Each of these tables 87a-87d is associated with a specific one of the four sheets 30 and includes the sheet number (the identifying code), position information and image recording information relating to the sheet concerned. Each sheet has its own specific sheet number which never changes, while the position information related to each sheet is updated each time the position of the sheet within the circulation path changes. For example, in FIG. 1, if the sheet 30 shown on the endless belt 7 is assigned the sheet number 1 (No. 1) and the other sheets are labeled No. 2, No. 3 and No. 4 in order in the direction reverse to that of sheet conveyance indicated by the arrow A, then when the sheets are in the respective positions shown in FIG. 1, the position information written into the respective sheet supervision tables 87a-87d will be as shown in FIG. 3.

Since the conveyance of the sheets 30 is controlled by the CPU 81 and the actual positions of the respective sheets are detected by the sensors 86, it is possible for the CPU 81 to ascertain which sheet is at which position on the basis of the sheet conveyance control signals sent to the driver 82 and the signals from the sensors 86. More specifically, as the sheets 30 pass through the image recording, image read-out and erasing steps, the CPU 81 progressively rewrites the position information for the sheets 30 (No. 1-No. 4) in the corresponding control tables 87a-87d on the basis of the signals output by the sensors 86 and the program stored in the memory 84.

The console 80 is used not only for entering the aforesaid operation instructions but also for entering, by means of a keyboard or the like, image recording information regarding the object 43 whose radiation image is to be recorded. This image recording information is written into the sheet supervision table 87a-87d corresponding to the sheet 30 positioned at the image recording section 40 at that time. That is, taking the positioning of the sheets shown in FIG. 1 as an example, since in this case the radiation image of the object 43 is to be recorded on the sheet 30 which has been labeled No. 2, the image recording information relating to the object 43 is written into the sheet supervision table 87b. This image recording information can include, for example, the ID number, name and complaint of the object 43 and data on the radiation image recording conditions such as the radiation dosage.

At the time the sheet 30 is forwarded to the image read-out section 50 and subjected to image read-out, the CPU 81 accesses the tables 87a-87d and selects the one thereof whose position information is recorded as "read-out." The CPU then reads the sheet number and image recording information from the selected table and sends this information to the image processing circuit 60 via an image processing circuit interface 88. Thus when the radiation image of the object 43 is reproduced on the CRT or other image reproducing apparatus 61, the image recording information regarding the object 43 and the number of the sheet 30 on which the radiation image was recorded are displayed at the same time.

The doctor who examines the reproduced radiation image for diagnostic purposes is thus able to refer to the image recording information in making his diagnosis. Also, if he observes any degradation in the quality of the reproduced radiation image which may be caused by deterioration of the stimulable phosphor sheet 30 on which it was recorded, he is at the same time able to read the sheet number of this sheet. From the sheet number it is a simple matter to identify which of the sheets in the radiation image recording and read-out apparatus 100 has deteriorated and then to replace it with a new one. At this time the position of the worn-out sheet 30 within the apparatus can easily be determined by reading the position information from the corresponding one of the sheet supervision tables 87a–87d. Alternatively, the sheet numbers can be printed on the sheets 30 in visible form and the sheet to be replaced can be located by its sheet number.

In the aforesaid embodiment, the sheet numbers are read by accessing the sheet supervision tables 87a–87d on the basis of the position information. Alternatively, instead of updating the position data in the tables 87a–87d in accordance with the passage of the sheets 30 through the image recording, image read-out and erasing steps, it is possible to successively switch the tables 87a–87d from which the sheet number is read out. In this case, it is not necessary to write position information for the respective sheets 30 into the tables 87a–87d.

Also, instead of storing the identifying codes, e.g. the sheet numbers, for the stimulable phosphor sheets 30 in the memory 87 as in the aforesaid embodiment, it is possible to record these codes directly on the stimulable phosphor sheets 30 and to read them out for reproduction at the same time as reading out the radiation image information. Further, instead of using numbers as the identifying codes for the stimulable phosphor sheets, it is possible to use characters, marks or the like.

In the aforesaid embodiment, the stimulable phosphor sheets are reused by repeatedly conveying them along a circulation path. The method of the present invention is, however, not limited to the use of such an image recording and read-out apparatus and can also be carried out using a system in which image recording and image read-out steps are carried out on a plurality of stimulable phosphor sheets as separate independent operations.

I claim:

1. In a radiation image recording and reproducing method wherein stimulable phosphor sheets are subjected to a radiation image recording step in which the stimulable phosphor sheet is exposed to a radiation passing through an object to have a radiation image of the object stored thereon and a radiation image read-out step in which the stimulable phosphor sheet carrying the radiation image stored thereon is exposed to stimulating rays which cause it to emit light in proportion to the stored radiation energy, the emitted light being photoelectrically detected to obtain an electric image signal for reproducing a visible image, the improvement comprising the steps of; providing each of a plurality of stimulable phosphor sheets with its own identifying code, said identifying code being non-erasable and irrelevant to the radiation image stored thereon identifying each stimulable phosphor sheet; randomly circulating said stimulable phosphor sheets free of a conveyor; identifying each randomly circulated stimulable phosphor sheet by reproducing its identifying code when the stimulable phosphor sheet is subjected to said radiation image read-out step; storing identifying code information of each stimulable phosphor sheet subjected to the radiation image read-out step; and counting the number of times each stimulable phosphor sheet is subjected to the radiation image read-out step; subjecting the stimulable phosphor sheet to an erasing step which is carried out after the stimulable phosphor sheet is subjected to said radiation image read-out step and in which the stimulable phosphor sheet is caused to release the radiation energy remaining thereon after said read-out step, and returning the erased stimulable phosphor sheet to the radiation image recording step for reuse; and selectively removing stimulable phosphor sheets upon reaching a predetermined number of random circulations based on the stored data and indicative of stimulable phosphor sheet wear out.

2. A method as defined in claim 1 wherein the identifying codes of the stimulable phosphor sheets are stored in a memory, the stimulable phosphor sheets are reused by successively circulating them repeatedly along a circulation path passing through said radiation image recording step, said radiation image read-out step and said erasing step, each stimulable phosphor sheet is identified and its identifying code is read from said memory when the stimulable phosphor sheet is subjected to said radiation image read-out step, and the read identifying code is sent to a reproducing means together with said electric image signal and reproduced thereby.

3. A method as defined in claim 1 wherein the identifying codes are recorded directly on the stimulable phosphor sheets, are read out in said radiation image readout step and are sent to and reproduced by a reproducing means.

* * * * *